Apr. 17, 1923.

A. C. LINDGREN 1,452,301

SULKY PLOW

Filed May 14, 1920

Inventor:
Alexus C. Lindgren
John P. Smith
Atty.

Apr. 17, 1923.

A. C. LINDGREN

SULKY PLOW

Filed May 14, 1920

Inventor:
Alexus C. Lindgren.
John P. Smith
Atty.

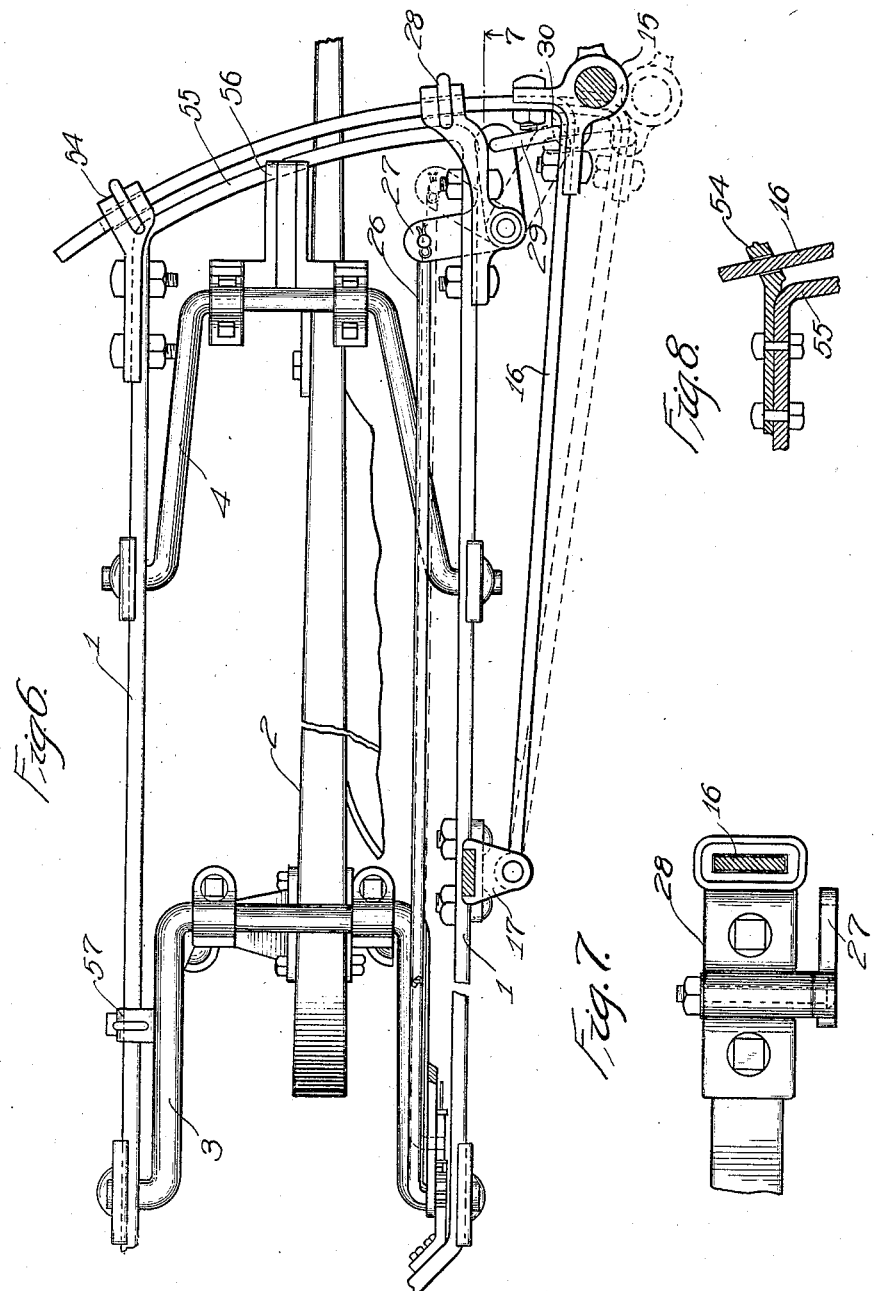

Patented Apr. 17, 1923.

1,452,301

UNITED STATES PATENT OFFICE.

ALEXUS C. LINDGREN, OF EVANSTON, ILLINOIS, ASSIGNOR TO INTERNATIONAL HARVESTER COMPANY, A CORPORATION OF NEW JERSEY.

SULKY PLOW.

Application filed May 14, 1920. Serial No. 381,439.

*To all whom it may concern:*

Be it known that I, ALEXUS C. LINDGREN, a citizen of the United States, residing at Evanston, in the county of Cook and State of Illinois, have invented certain new and useful Improvements in Sulky Plows, of which the following is a full, clear, and exact specification.

This invention relates to wheel plows and one object is to provide improvements in the plow-lifting mechanism whereby with a simplified construction the lifting spring is arranged to serve the additional function of resiliently urging the toggle to hold the plow down after the toggle links of the lifting mechanism have passed a predetermined point in their movement.

A further object of the invention is to provide an improved means of support or bearing for a pivoted bracket-shaped carrying arm for the front furrow wheel.

The object is accomplished by forming the front portion of the plow frame in an arc and also forming the forward end of the front furrow carrying arm in an arc which is coincident with the arc at the front of the frame and arranging widely spaced bearings for the carrying arms at a plurality of points along the arc part of the frame.

This object is accomplished by the device shown in the accompanying drawings in which—

Fig. 6 is a fragmentary plan view showing the mounting of the front furrow wheel carrying arm.

Fig. 7 is a sectional detail taken on the line 7—7 of Fig. 6 and shows the right hand bearing bracket for the front furrow wheel carrying arm.

Fig. 8 is a sectional detail in plan showing the left hand bearing bracket for the front furrow wheel carrying arm.

Figure 1:
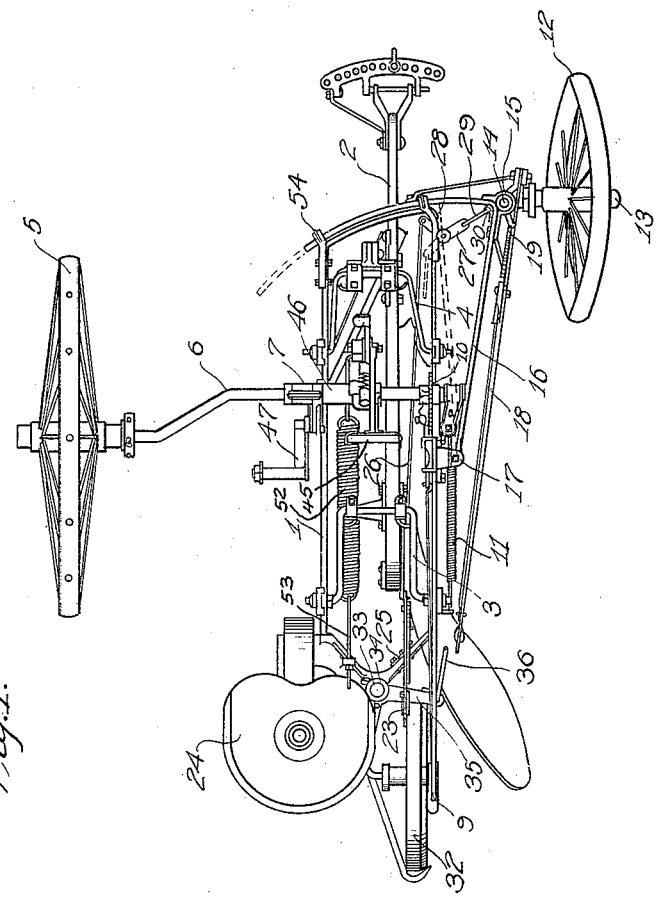
Figure 1 is a plan view of a plow constructed according to this invention, the tongue and its bracket being omitted.
Figure 2:
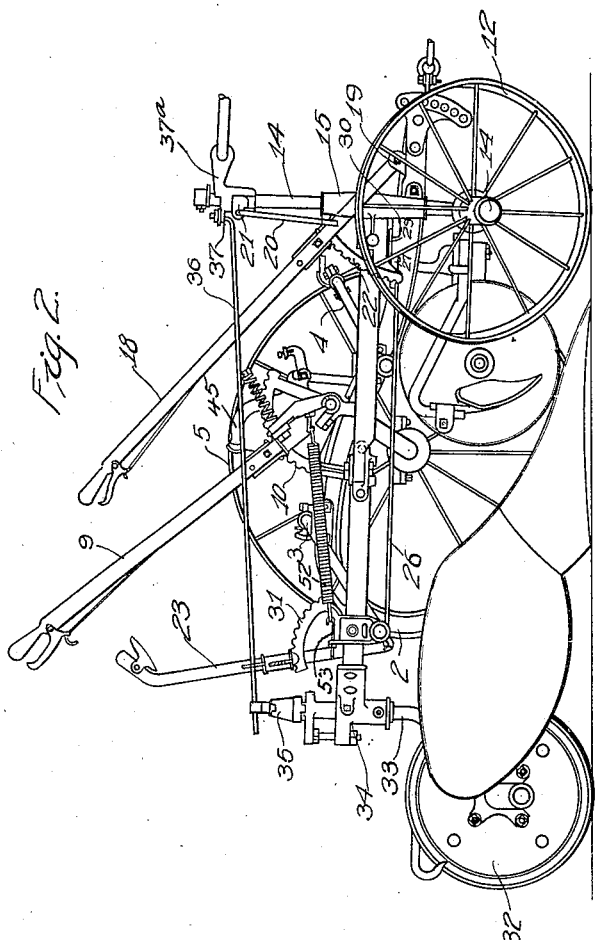
Fig. 2 shows the plow in side elevation.

An aim of the construction is to arrange the lifting spring so that it will serve to counterbalance the plow in the raising action thereof but will also serve to urge the toggle lifting mechanism toward or past its dead center, so that the plow may be either positively or resiliently held to its work and this purpose is accomplished without adding any complications and in a way permitting simplification of the mechanism.

The remaining purpose of the invention is to provide in a plow, in which the front furrow wheel is carried by a pivoted arm, a bearing arrangement for this arm better suited to resist the strains to which it is subjected and in which the ease of operation will not be impaired after considerable use of the same. The front furrow wheel is carried on a pivoted arm as this is a convenient method of regulating the width of cut, and is desired by some plow users.

The general features of the plow common in this class of devices are the frame structure 1 from which the plow beam 2 is supported by a pair of bales 3 and 4. These bales are of different lengths or set at the required angles to cause the desired variation in vertical pitch of the plow as it enters or leaves the ground. The land-wheel 5 is journaled at the end of the crank axle 6, which is adjustable in bearings 7 and 8 on frame 1, by means of lever 9, cooperating with the fixed locking quadrant 10. The lever 9 is fast to the crank axle 6, and its work when rocked downwardly in the action of raising the plow frame is aided by spring 11.

The front furrow wheel 12 is journaled on the lower bent end 13 of the vertical spindle 14, the bearing 15 for this spindle is secured to the longitudinally extending arm 16 which is pivoted at its rear end to bracket 17 clamped to the frame 1. The frame 1 and the plow beam carried thereby can be adjusted vertically along the spindle 14 by means of the hand lever 18. Lever 18 is pivoted at its lower end to a bracket extension 19 of bearing 15 and is connected intermediate its ends by link 20 to a collar 21 retained against vertical displacement on the upper end of spindle 14. When the lever 18 is operated it pivots on the lower end of link 20 and thus serves to raise or lower the bearing 15 along the spindle 14. Lever 18 is locked in its set position at the quadrant 22 integral with bearing 15.

The front furrow wheel may be swung inwardly and outwardly by means of the hand lever 23 located at the right of the sulky seat 24. This lever is pivoted intermediate its ends to a bracket 25 secured to frame 1, and the lower end of the lever is connected by the link 26 to a bell crank lever 27 pivoted to a bearing bracket 28 secured at the front end to frame 1. The bell crank lever is in turn connected by a link 29 to a lug 30 on the bearing 15 carried by the arm 16. Operation of the hand lever 23 by rocking the bell-crank lever 27 serves to swing the arm 16 around its pivotal connection with bracket 17 and in this manner regulates the lateral position of the front furrow wheel with respect to the plow and thus determines the position of the plow with reference to the furrow in which wheel 12 is running. The locking quadrant 31 for lever 23 is fixed to the rear end of frame 1.

The rear furrow wheel 32 is journaled on the lower bent end of an upright spindle 33, which is rotatable in a bearing 34 at the rear end of frame 1 but carries rigidly an arm 35 which is connected by a link 36 to a slotted arm 37 integral with the tongue supporting bracket 37ª which is fixed to the upper end of spindle 14. The slotted arm 37 through which the forward bent end of link 36 extends laterally along the arm as usual and therefore normally prevents longitudinal motion of link 36 and the free castering of the rear furrow wheel 32. When the tongue pivots in bearing 15 in turning the plow, the slot in arm 37 takes a more or less longitudinal setting and thus permits a limited free castering of the rear furrow wheel during turning.

The lifting toggle for the plow beam comprises a pair of toggle arms 38 and 39 pivoted together at their inner ends by a bolt 40 and respectively journaled at their outer ends on the crank axle 6, and the bolt 41, extending laterally from an adjustable bracket 42 carried by the plow beam 2.

Figure 5:
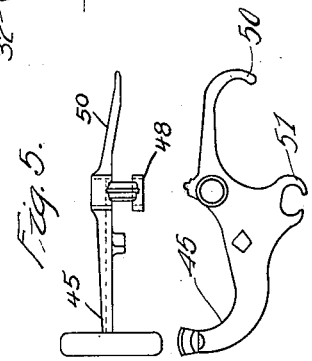
Fig. 5 shows details in plan and side elevation of the plow lowering foot lever.

The extent of the straightening action of the toggle or its extent of movement past dead center is regulated by an adjustable screw 43 carried at the end of an extension 44 of toggle arm 38 and coacting with toggle arm 39. The toggle is moved toward its straightened position by the plow lowering foot lever 45. The lever 45 is journaled on the crank axle 6 at the side of the sleeve 46 which carries the plow raising foot lever 47. The sleeve 46 and toggle arm 38 are preferably integral and yoked over a bearing collar 48 integral with the lowering foot lever 45 as shown in Fig. 5. This arrangement compels the raising and lowering levers normally to move together but permits a limited independent preliminary movement of the lowering lever 45 against the action of spring 49 compressed between lugs on the lowering lever 45 and toggle arm 38.

The purpose of this limited free motion of the lowering lever 45 is to permit the integral locking arm 50 thereof to free itself from bracket 42 before the toggles are moved toward straightened position.

Integral with lever 45 has a jaw extension 51 which encircles a boss on toggle arm 38 surrounding a bolt 40. The jaw 51 is made large enough to allow for the independent motion of the lowering foot lever 45 but through engagement with the boss urges the toggle toward or away from its straightened position.

When the plow raising foot lever 47 is depressed it rocks the toggle link 38 upwardly due to the fact that this link is integral with the sleeve 46 to which the lever 47 is securely fastened. As the plow reaches its fully raised position the locking extension 50 on lever 45 cams over the lower end bracket 42 to its locking position under the action of spring 49.

The plow beam lifting spring 52 is extended between an adjustable hook 53 secured to rear end of frame 1, and the lower end of toggle arm 39 a short distance above bolt 41. By this arrangement after the toggle is broken by motion of lever 47, the spring 52 serves to counter-balance the weight of the plow and urge it upwardly, but when the toggle arms are near the dead-center position or past it, this spring serves to hold the toggle in this position as regulated by the adjustable screw 43.

The front furrow wheel mounting in which the present invention resides comprises the bearings 54 and 28 shown in Figs. 6, 7, and 8. These are respectively secured at the left and right corners of the forward arc portion 55 of frame 1. The front furrow wheel carrying arm 16 at its forward end is bent laterally into an arc conforming to the arc portion 55 of frame 1 and passes through the bearings 28 and 54. By this arrangement widely spaced bearings are possible for the wheel carrying arm 16 and permit of a reasonable amount of wear before looseness is perceptible at the front furrow wheel. The curved portion 55 of frame 1 serves as a rest for bale 4 when the plow is in its lowermost position, at which time the stop 56 secured to bale 4 engages part 55 of the frame. Bale rests 57 are provided at the sides of frame 1 for bale 3.

In the operation of the device the plow frame is leveled and adjusted vertically in the usual manner in this class of plow by the levers 9 and 18. Lateral adjustment of the front furrow wheel 12 is accomplished by means of the hand lever 23, which through the rod 26 serves to rock bell crank lever 27 and the motion is communicated from the latter to the bearing bracket 15 and arm 16 through the link 29. The arm 16 is mounted to resist lateral and longitudinal strains and is guided in its lateral motion by the bearings 54 and 28 which serve to prevent any perceptible vertical or twisting motion of the rear extension of the arm, particularly due to the fact that these bearings are spaced laterally the maximum amount.

Figure 3:
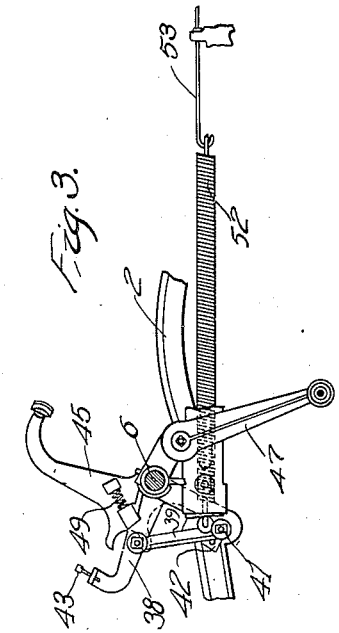
Fig. 3 is a detail of the toggle and lifting levers, viewed from the left of Fig. 2 and shows this mechanism as it appears when the plow is in raised position.
Figure 4:
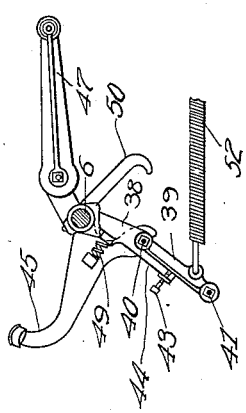
Fig. 4 is a detail similar to that shown by Fig. 3 but shows the mechanism as it appears when the plow is in its extreme lowered position.

The toggle lift mechanism for the plow beam is operated to lift the plow by a depression of foot lever 47; this lever being rigidly secured to an arm on the sleeve 46, rotates the sleeve and the latter being integral with toggle arm 38 serves to rock the toggle arm 38 upwardly drawing the companion toggle arm 39 with it until the toggle assumes the position shown in Fig. 3. During this motion the locking part 50 of the foot lever 45 is carried beneath a boss on the beam near the lower end of toggle arm 39 serving to lock the mechanism until the foot lever 45 is depressed sufficiently to compress the spring 49 and thus release the latch. Further depression of the foot lever 45 through its jaw 51 engaging the toggle arms at their pivotal point 40 restores the toggle mechanism to a position shown in Fig. 4. By this action the pivotal connection 41 between toggle arm 39 and the plow beam is lowered, thus causing the plow to enter the ground. If the toggle arms are permitted to pass dead-center by the setting of screw 43, lifting spring 52 then serves to retain the plow in the soil by holding the toggles in a locking position. The lifting spring will also serve to retain the plow in the soil yieldingly when the toggle arms have not passed a dead-center position but are near it. This is also determined by an adjustment of screw 43. In this case, the spring serves to resiliently hold the plow down. The plow can move upwardly upon encountering an obstruction.

What I claim for my invention is:

1. A tillage implement comprising a main frame having at one end a pair of horizontally spaced bearing members, a furrow wheel, a support for the furrow wheel pivoted to the main frame for horizontal motion and having a laterally extending curved portion slidingly supported by said bearings.

2. A tillage implement comprising a main frame and supporting wheels, said frame having at its forward end a curved portion, bearings spaced laterally on said curved portion, a furrow wheel support guided in said bearings and having a portion extending rearwardly, said portion of the furrow wheeled support being pivoted to the frame at a point concentric with the forward curved portion of the frame.

3. A wheeled plow comprising a frame, a forwardly extending arm connected to the frame by a vertical pivot and having a laterally extending portion slidably mounted on the frame, means for swinging the arm, and a front furrow wheel mounted on the forward portion of the arm.

4. A wheeled plow comprising a frame, a forwardly extending L-shaped bar having its longer arm connected to the frame by a vertical pivot and its shorter arm slidably mounted on the frame, means for swinging said bar, and a front furrow wheel mounted on the forward portion of said longer arm.

5. A wheeled plow comprising a frame, an L-shaped bar having its longer arm hinged to the furrow side of the frame on a vertical pivot and its shorter arm slidably supported in bearings on the forward end of the frame, means for swinging said bar towards and from the frame, a bracket secured to said bar at its angle, and a front furrow wheel having a standard journaled in said bracket.

In testimony whereof I affix my signature.

ALEXUS C. LINDGREN.